(No Model.)

A. RING.
BROADCAST SEEDER.

No. 547,524. Patented Oct. 8, 1895.

Witnesses.
C. H. Scivers
E. A. Homans

Inventor.
Aaron Ring.

UNITED STATES PATENT OFFICE.

AARON RING, OF HYDE PARK, MASSACHUSETTS.

BROADCAST SEEDER.

SPECIFICATION forming part of Letters Patent No. 547,524, dated October 8, 1895.

Application filed June 8, 1895. Serial No. 552,117. (No model.)

*To all whom it may concern:*

Be it known that I, AARON RING, of Hyde Park, in the county of Norfolk and State of Massachusetts, have invented a new and Improved Apparatus for Sowing Seeds Broadcast by Centrifugal Force from a Horizontal Shaft; and I do hereby declare that the following is a full, clear, and exact description of the same, reference being had to the annexed drawings, making a part of this specification.

I make my distributing-tubes telescopic, (see Figure 1, at T,) so that they can be pressed in toward the axis of motion or moved out from two to six inches, as the seeds may require for suent distribution. I make the outer ends nearly flat or fan shape, with the long way parallel with the axis of motion. (See Fig. 1, letter F.) These tubes can be made of any suitable material. I prefer IX tin-plate and from one to two inches diameter, more or less, round, oval, or square, and from six to fifteen inches long. The hand-machine should be made of lighter stock than the horse-power. I shorten one side of the fan-shaped end from one to two inches, (see Fig. 1, at S,) so that when the tubes appear to hold the seeds too long these tubes can be turned half-way round on the head, making the short side the point of delivery. With the telescoping and changing front with the tubes I can cover all weights of seed, from wheat, sixty pounds per bushel, and oats, thirty-two pounds per bushel, to red-top-grass seed, fourteen pounds per bushel, doing all the work on a large farm with one set of tubes, and doing it well. In the revolving head, Fig. 1, at N, a nut is placed, into which the main shaft is fastened, and extends to the rear of the hopper about ten inches, more or less, from the nut, passing through two or more bearings and receiving its pulley or crank motion. The breast-plate may be secured to the rear of the hopper in the hand-sower.

Figure 1:
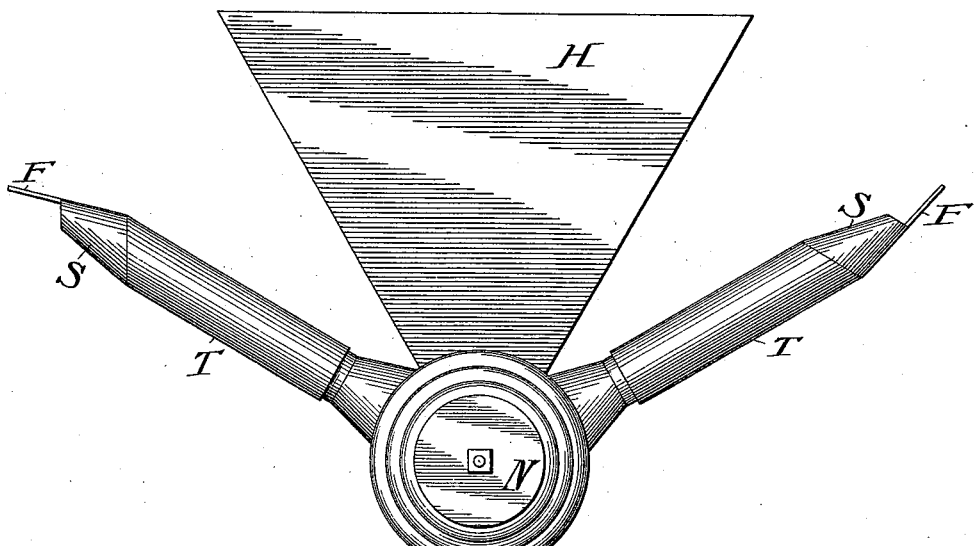
Figure 2:
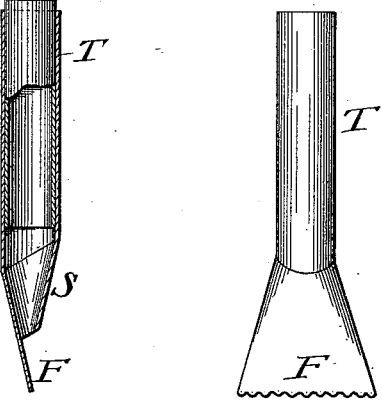

Fig. 1 is a side view, and at H shows outline of hopper. Fig. 2 is a detail view, and F indicates the outer end of fan-shaped tube.

I know there have been made many and varied hand seed-sowers, throwing the seeds by centrifugal force, but doing it in an imperfect manner. My improvements are in the working parts, as the claim will show.

I claim—

In a centrifugal scatterer for seeding machines, a revolving head provided with tubes in combination with adjustable telescoping sections, carrying fan shaped distributing points, substantially as shown and described.

AARON RING.

Witnesses:
ALBERT W. BROWN,
MARION E. BROWN.